J. F. MOTZ.
MOTOR CONTROL SYSTEM.
APPLICATION FILED JULY 21, 1913.
1,122,788.
Patented Dec. 29, 1914.
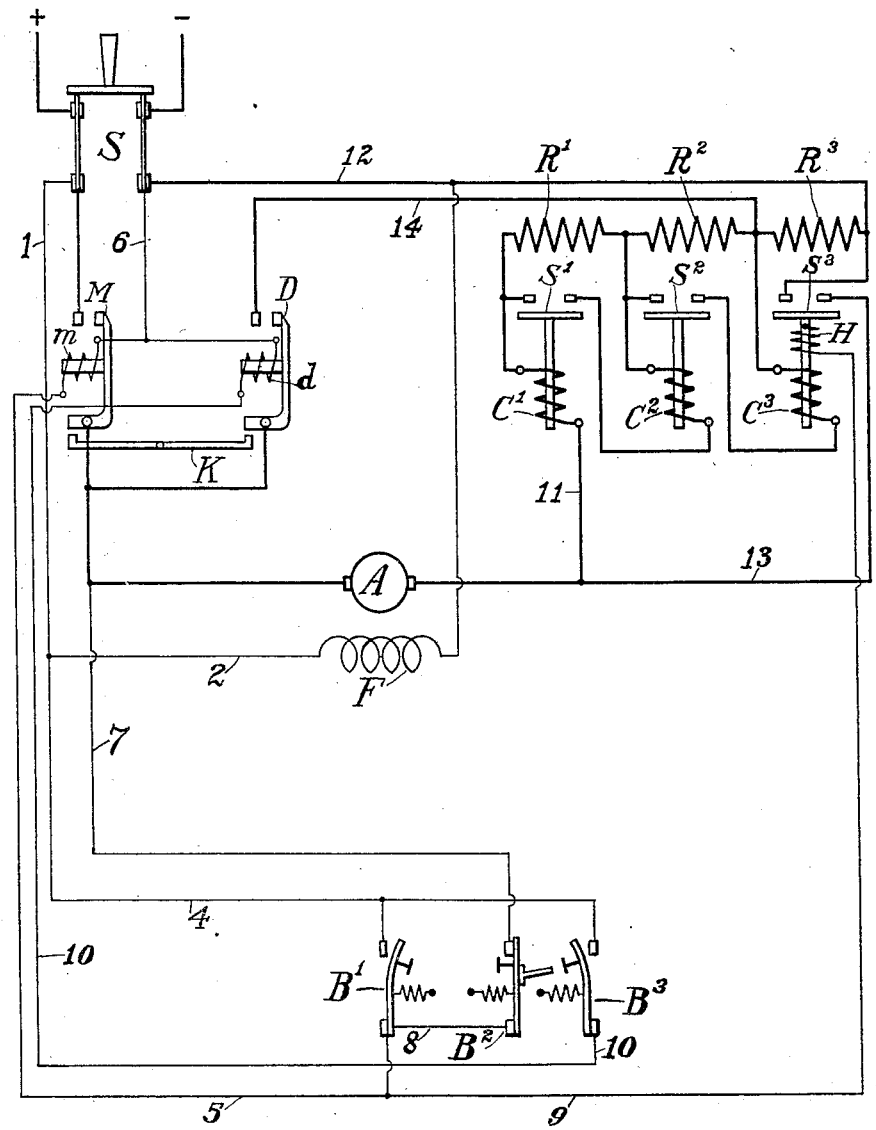
WITNESSES:
Elva Stanek
Alice E. Duff
INVENTOR
J. F. Motz
BY
F. N. Barber
ATTORNEY

UNITED STATES PATENT OFFICE.

JACOB F. MOTZ, OF PITTSBURGH, PENNSYLVANIA.

MOTOR-CONTROL SYSTEM.

1,122,788.

Specification of Letters Patent.

Patented Dec. 29, 1914.

Application filed July 21, 1913. Serial No. 780,132.

*To all whom it may concern:*

Be it known that I, JACOB F. MOTZ, a citizen of the United States, residing at Pittsburgh, in the county of Allegheny and State of Pennsylvania, have invented a new and useful Motor-Control System, of which the following is a specification.

My invention relates to motor-control systems, particularly to those in which magnetically-operated switches are used to regulate the resistances in the motor circuit.

More particularly, it relates to systems in which the same resistance controlling switches are used in starting the motor when connected to a suitable source of supply and in stopping the motor by dynamic braking. For the switches controlling the resistances, I prefer to use those having operating windings energized by current in the motor circuit.

In the accompanying drawing, which is a diagrammatic representation embodying my invention, the motor is shown with the armature A and the field winding F. The system is connected to a source of supply by means of the switch S. For closing the motor circuit to start the motor, I use the switch M, which is magnetically operated and controlled by means of the push buttons B' and B². For connecting the motor in the dynamic braking circuit I use the magnetically operated switch D, which is controlled by the push button B³. The interlocking bar K is used to prevent the simultaneous closure of the switches M and D. The resistances R', R², and R³ are controlled by the magnetically-operated switches S', S², and S³, which have their operating windings C', C², and C³ arranged to be connected in the motor circuit. I prefer to use for these switches the type of switch described in Eastwood's Patent 1,040,292, which has the peculiar characteristic of remaining open if the current in the operating winding is above a predetermined value, and closing its contacts when the current in the winding is reduced. The switch S³ is provided with a holding winding H, which is a fine wire winding adapted to be connected across the source of supply to hold the switch closed. One terminal of this winding is connected to the push buttons B' and B², while the other terminal is connected to a part of the switch and the winding becomes energized upon the closure of the switch.

In starting the motor, the motor is connected to the source of supply through the switch M, the circuit including the winding C' of the switch S' and all the starting resistance. The starting resistance is then automatically cut out by the closure of the resistance switches, the motor being thus brought up to speed.

To stop the motor the switch M is opened and the switch D closed, whereupon the motor is connected in a closed or dynamic braking circuit, including the winding C' of the switch S' and the portions R' and R² of the starting resistance. These portions of the resistance are then cut out automatically by the closure of the switches S' and S², and the motor is quickly brought to rest by the current flowing in the dynamic braking circuit, which is maintained at a high value by the cutting out of the resistances therein.

The operation of the control system is as follows: When the switch S is closed, the field of the motor is energized from positive through the wires 1 and 2, the field F, and the wire 12 to the negative. The motor is started by the operator pressing the normally open push button B'. The winding m of switch M is then energized through the circuit from positive through the wires 1 and 4, the contacts of the push button B', the wire 5, the winding m, and the wire 6 to the negative. The switch M thereupon closes and is then held closed by its winding which is now energized from the positive through the contacts of the switch M, the wire 7, the contacts of the push button B², the wires 8 and 5, the winding m, and the wire 6 to negative. The operator can now release the push button B' and the switch M will remain closed through the circuit including the push button B² which has just been described. Upon the closure of the switch M, the motor circuit is as follows: from positive through the switch M, the motor armature A, the wire 11, the switch winding C', the resistances R', R², and R³, and the wire 12 to the negative. The motor now starts and may be brought up to speed by the progressive closure of the switches S', S², and S³, each switch being prevented from closure until the current in its winding has diminished to such a value as will be safe for cutting out the next section of resistance. The switch S' in closing cuts out the resistance R' and energizes the winding C² of the switch S². Likewise the switch S² in closing cuts out the resistance R² and energizes the winding C³ of the switch S³. When the switch S³ closes, current goes through the wire 13, the contacts of the switch S³, and the wire 12, instead of through the wire 11, as previously traced. The switch S³ in closing cuts out the resistance R³ and deënergizes the windings C', C², and C³. The switches S' and S² drop open, but the switch S³ remains closed since it is held closed by its winding H, which is energized upon closure of the contacts of the switch S³.

To stop the motor, the operator can open the normally closed push button B², which will cause the switch M to open and disconnect the motor from the source of supply, allowing the motor to come to rest. The opening of the switch B² also deënergizes the winding H, causing the switch S³ to open. If a quick stop is desired, the operator closes the normally open push button B³, which can be accomplished by a continued movement of the push button B². The push button B³ in closing energizes the winding d of switch D through the following circuit: from positive through the wires 1 and 4, the contacts of the push button B³, the wire 10, the winding d, and the wire 6 to the negative. The switch D now closes and connects the motor in a dynamic braking circuit which is as follows: from the left-hand brush of the armature A, through the switch D, the wire 14, the resistances R² and R', the winding C' of the switch S', and the wire 11 to the right-hand brush of the armature. Current flowing in this circuit causes the winding C' to close switch S' when the current is reduced to the proper value. This cuts out the resistance R' and energizes the winding C² of the switch S². The cutting out of the resistance R' causes the motor current to increase, thereby increasing the retardation of the motor. When this current is reduced to the proper amount, switch S² closes, thereby cutting out the resistance R² and energizing the winding C³ of the switch S³. This causes a further increase of current and further retardation of the motor. Upon the closure of the switch S³, the resistance R³ is connected in parallel with the windings C', C² and C³, and the resistance of the circuit is now of a very low value, which will bring the motor quickly to rest. The circuit of the holding winding H is opened upon the opening of the push button B², so that no current flows in this winding while the motor is being slowed down. When the motor comes to rest, current ceases to flow in the motor circuit, and all the switches will open their contacts, their windings being deënergized. To start the motor again, the operator releases the push buttons B² and B³, allowing them to assume their normal positions as shown in the drawing, and closes the push button B'. The operation will then be as previously described.

When the dynamic braking circuit is closed, the current in the windings C', C² and C³ is in a reverse direction to that when the motor is being started. This assists in locking the switches open when the current is too high, but does not interfere with the closure of the switches when the current in the winding diminishes to the proper value.

It will be readily understood by those skilled in the art that other arrangements of parts can be made than those here shown without departing from the spirit of my invention.

I claim—

1. In a motor control system, a motor armature, a switch, a resistance controlled thereby, a winding for closing the switch, means for connecting the armature and the winding to a source of supply to start the motor, and means for connecting the armature and the winding in a closed circuit to stop the motor.

2. In a motor control system, a series of switch contacts, resistance controlled thereby, windings for operating the contacts, a motor armature, means for connecting the contacts, the resistance, and the switch windings to a source of supply in series with the motor armature to start the motor, for disconnecting the said contacts, resistance, and switch windings from the source, and for connecting them in a closed circuit with the armature to slow down the motor.

3. In a motor control system, a motor armature, a resistance, switch contacts for controlling the resistance, a winding for operating the contacts energized by current through the motor, means for connecting to a source of supply the armature, the winding, and the resistance all in series, and for connecting the armature, the winding, and the resistance in a closed circuit.

4. In an electric controller, a circuit, a resistance for controlling the circuit, switch contacts therefor, a winding for operating the contacts connected in the circuit, a switch for connecting the winding and the resistance to a source of supply, and means for connecting the winding and the resistance in a closed circuit when the said switch is opened.

5. In an electric controller, a circuit, a resistance for controlling the circuit, switch contacts therefor, a winding for operating the contacts connected in the circuit, a switch for connecting the winding and the resistance to a source of supply, and means for connecting the winding and the resistance in a closed circuit when the said switch is opened.

Signed at Pittsburgh, Pa., this 19″ day of July, A. D. 1913.

JACOB F. MOTZ.

Witnesses:
ALICE E. DUFF,
ELVA STANIEK.